Oct. 12, 1937.  H. R. PRESCOTT  2,095,676
METHOD OF MAKING GEOLOGICAL EXPLORATIONS
Filed July 24, 1935  3 Sheets-Sheet 1

INVENTOR
Harold R. Prescott
BY
ATTORNEY

Oct. 12, 1937.  H. R. PRESCOTT  2,095,676
METHOD OF MAKING GEOLOGICAL EXPLORATIONS
Filed July 24, 1935    3 Sheets-Sheet 2

INVENTOR
Harold R. Prescott
BY
ATTORNEY

Oct. 12, 1937.  H. R. PRESCOTT  2,095,676
METHOD OF MAKING GEOLOGICAL EXPLORATIONS
Filed July 24, 1935   3 Sheets-Sheet 3
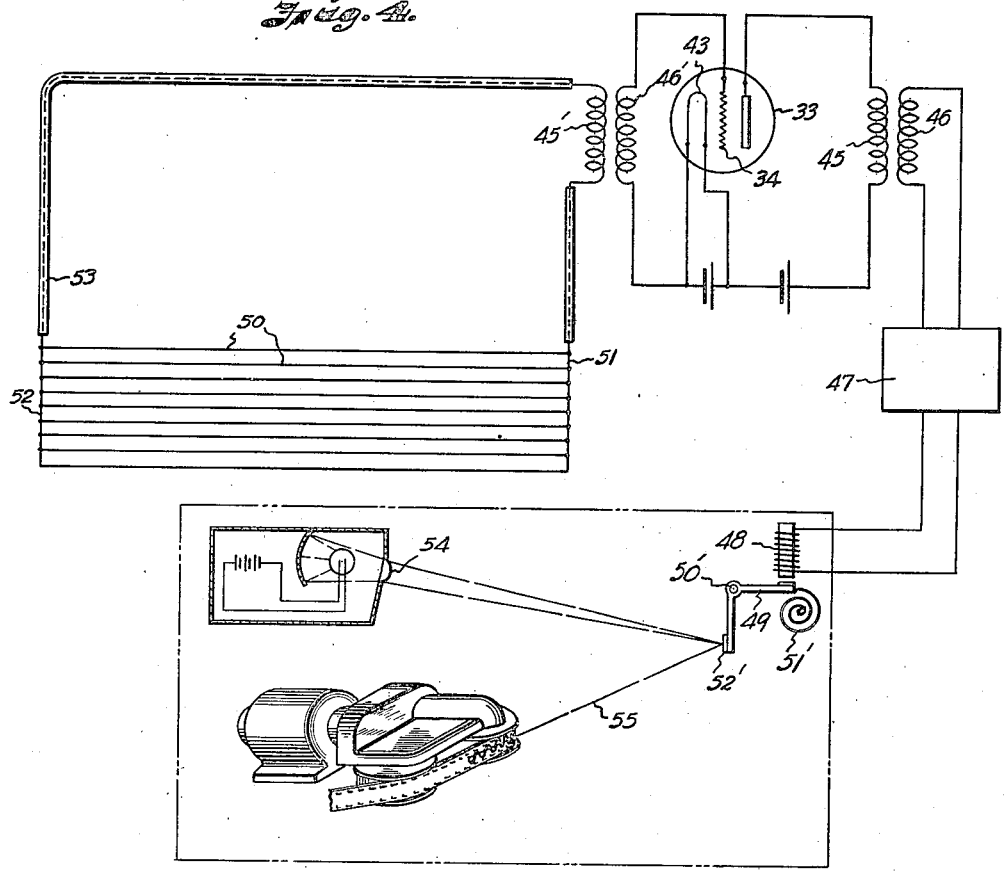
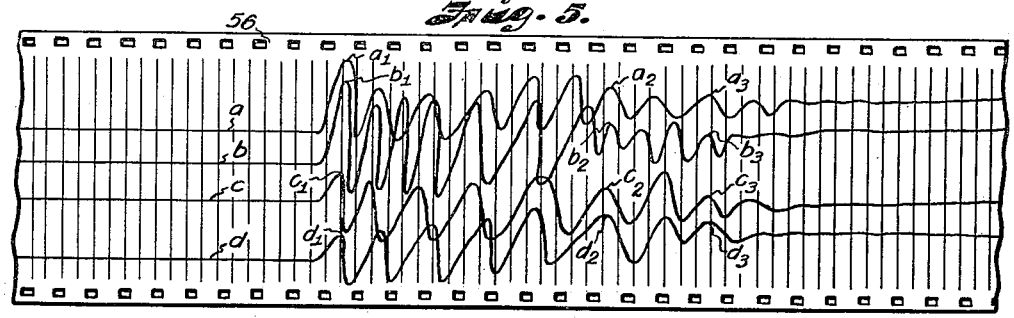
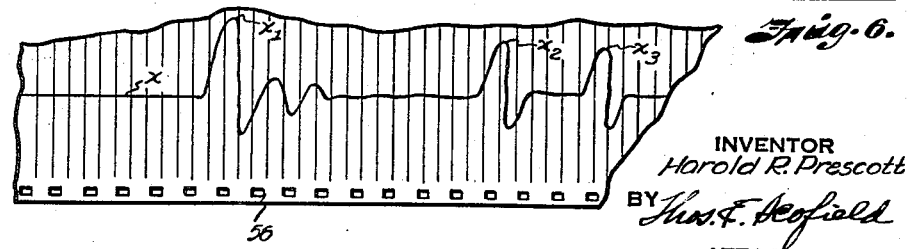
INVENTOR
Harold R. Prescott
BY
ATTORNEY Patented Oct. 12, 1937

2,095,676

UNITED STATES PATENT OFFICE 2,095,676

METHOD OF MAKING GEOLOGICAL EXPLORATIONS

Harold R. Prescott, Ponca City, Okla., assignor to Continental Oil Company, Ponca City, Okla., a corporation of Delaware Application July 24, 1935, Serial No. 32,872

2 Claims. (Cl. 181—0.5)

My invention relates to a method of making geological explorations and more particularly to a method in which earth vibrations are generated at or near the earth's surface and received after they have been reflected from sub-surface strata.

Since the beginning of geological explorations by seismographic methods, geophysicists have been limited by the devices existing for receiving vibrations reflected from sub-surface strata. The seismographs known to the art are those which respond to the earth's motion at points on or near the earth's surface. In other words, the devices, because of their size and configuration, occupy only a very limited area on the earth's surface.

In an attempt to circumvent the disadvantages inherent in receiving vibrations at a single point, operations have been conducted in difficult areas by employing a number of seismographs, electrically connected so that the phase motions received by the seismographs are added. The resultant of the various impulses received by the plurality of seismographs is delivered to an amplifier. The use of a number of seismographs has helped and extended the usefulness of seismographic methods of geological exploration. There are a number of areas in which geological explorations have failed to provide records sufficiently free of useless high amplitude vibrations generated in the near surface layers. These areas are more specifically sand dune areas and certain areas in which surface formations are of a very unconsolidated nature, such as the marsh and swamp areas. In areas of this character, the loose nature of the surface makes it possible for all of the separate particles to vibrate at known frequencies after receiving the impulse of elastic waves reflected from geological beds below the surface. These loose particles continue to oscillate because of the small damping between particles after having received the impact of the first arrival or the direct wave. In these areas in which unfavorable surface conditions exist, the surface acts in general like a mass of jelly when direct waves from an explosion are received.

None of the usual methods of geophysical exploration are adequate to provide a means for exploring these areas. It is found that it is impossible to make sufficient discrimination between useful arrivals and the worthless ones.

It is recognized that, if is were feasible to employ for each amplification channel tens of thousands of seismographs, electrically connected with the individual seismographs distributed over a large area, the area could be explored since the useful arrivals would be in phase, while the worthless vibrations would be of heterogeneous frequencies and out of phase so that they would tend to cancel each other, while the useful arrivals would be cumulative. Furthermore, the useless vibrations in the loose near surface particles would interfere, due to the large number of instruments employed. It will be obvious that it is a matter of practical impossibility to employ such a large number of receiving devices. The cost of construction would prevent any attempt of this character to be made, even experimentally.

One object of my invention is to provide a method of geophysical exploration in which areas having loose unconsolidated surface layers can be successfully explored.

Another object of my invention is to provide a method of receiving seismic vibrations over an extended area.

In the accompanying drawings which form part of the specification and are to be read in conjunction therewith and in which like reference numerals are used to indicate like parts in the various views;

Figure 4 is a diagrammatic view of another form of apparatus capable of carrying out the process of my invention.

Figure 5 is a view of a record strip showing the impulses recorded on a record strip from four seismophones.

Figure 6 is a view of a record strip showing the record made by the process of my invention.

In general, my invention contemplates the generating of earth vibrations by exploding or detonating a charge of explosive and receiving the reflections of the elastic waves over an extended area and recording the resultant of all waves received over the area at a particular instant.

Figure 1:
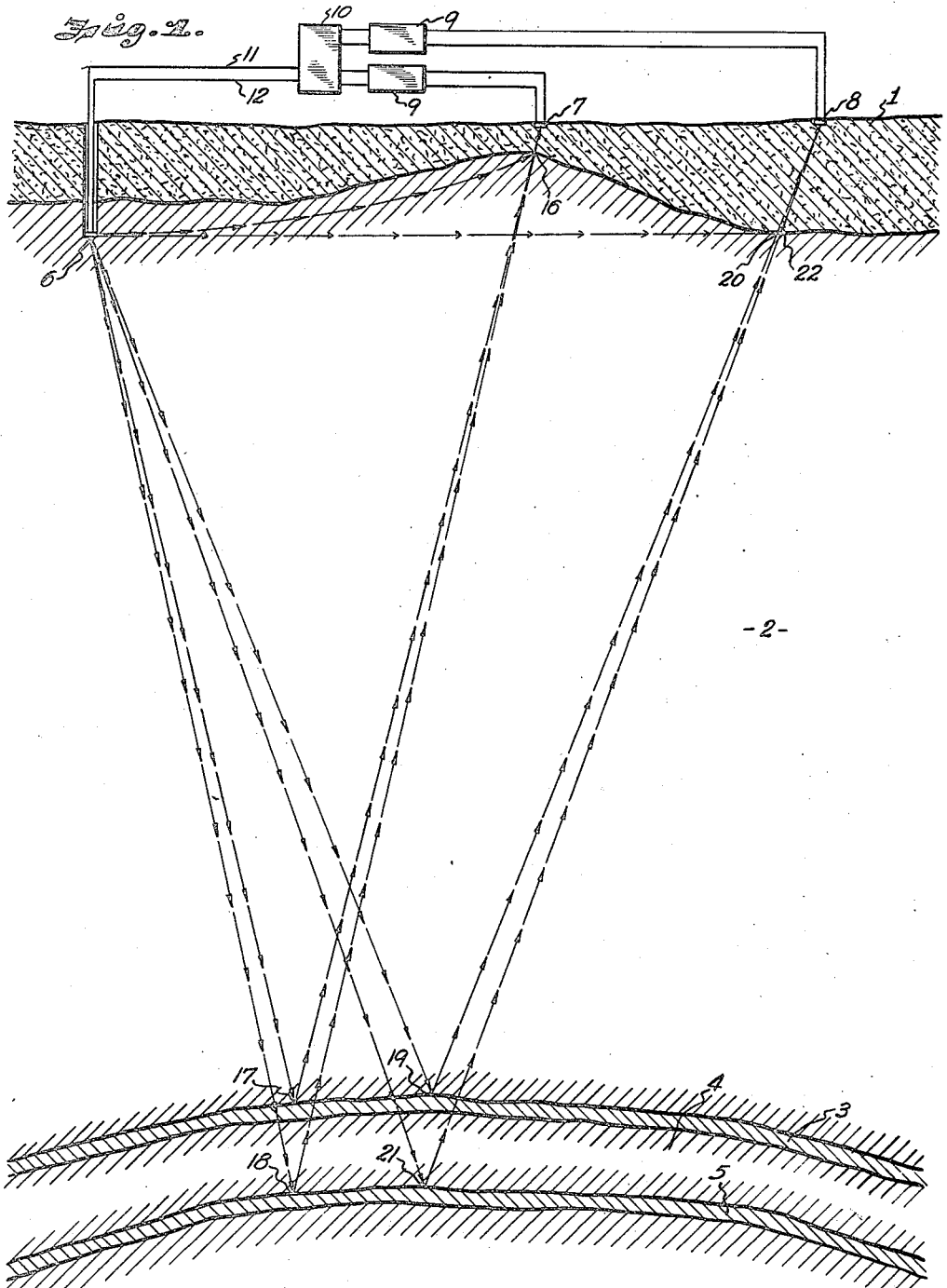
Figure 1 is a diagrammatic view showing a section of the earth's surface and the paths of vibrations therethrough.

Referring now to the drawings, and more particularly Figure 1, the unconsolidated or weathered layer of the earth's surface is represented by reference numeral 1. Layer 2 is a strata of one characteristic. Layer 3 is a layer having different characteristics than layer 2. Layer 4 is a stratum having different characteristics than layer 3. In many areas, the character of layer 4 is similar to that of layer 2. Stratum 5 is of different physical characteristics than layer 4 and, in many areas, is of similar nature to that of layer 3. Point 6 is a point at which the explosive charge is detonated and is the point of origin of the elastic waves. Usually it is preferable to locate the point of origin below the unconsolidated layer 1. The arrows show some paths of the elastic waves generated. One seismophone is represented by the numeral 7, while 8 represents another seismophone. Each of the seismophones delivers its output to respective amplifying units 9, the outputs of which are recorded by recorder 10. 11 and 12 are conductors through which the electrical impulses for recording the time of origin of the sound pass. It will be seen that the first arrival at seismophone 7 will be along path 6—16—7. Seismophone 7 will also receive reflections from layers 3 and 5. The first arrival from layer 3 will be along path 6—17—16—7. The first arrival at seismophone 7 from layer 5 will be along path 6—18—16—7. Similarly, the first arrival of a reflection from layer 3 at seismophone 8 will be along path 6—19—20—8, while the first arrival from layer 5 will be along path 6—21—22—8.

Referring now to Figure 5, trace $a$ shows the impulses received by seismophone 7. Trace $b$ shows the impulses received by seismophone 8, while traces $c$ and $d$ show the impulses received by two additional seismophones which are not shown on Figure 1.

Figure 2:
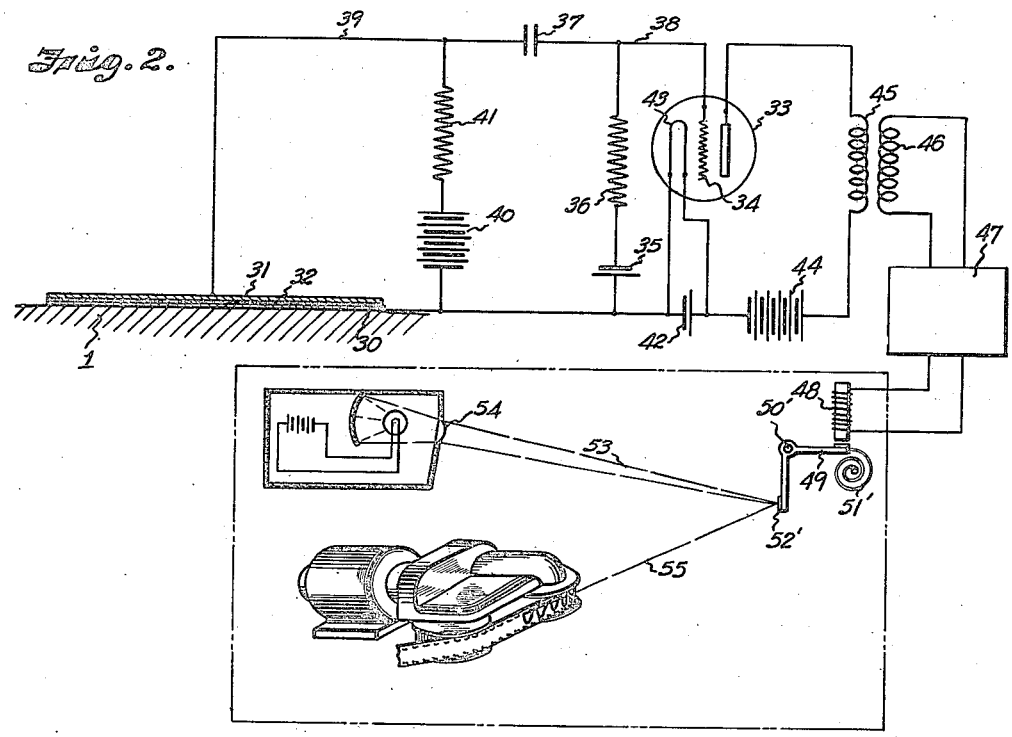
Figure 2 is a diagrammatic view of one form of apparatus capable of carrying out the method of my invention.

Referring now to Figure 2, a solid sheet or flexible screen 30 extends over a large area and may rest upon unconsolidated layer 1 of the earth's surface. Supported and suitably spaced from sheet 30 is a second sheet 31. This sheet may likewise be a solid sheet or a screen of flexible wire mesh or the like. The two sheets 30 and 31 are held in spaced position by a layer of elastic dielectric material 32. A sheet of rubber or spaced disks of rubber positioned sufficiently close to one another to hold sheets 30 and 31 apart, will serve. A layer of rubber and a layer of mica may be used. It will be observed that sheets 30 and 31, spaced from each other, form a condenser. It will be further observed that, when the earth vibrates, sheet 31 will tend to remain stationary in space due to inertia. It may be made of sufficient weight to have the required or desired inertia. As sheet 30 moves with respect to sheet 31 in the form shown in Figure 2, a variation in capacity will result. The thin layer of rubber 32 has sufficient damping characteristics to give the sheet 30 proper damping in order to eliminate the fundamental frequency of motion. 33 is a usual triode. The grid 34 is biased by battery 35, through resistance 36. A blocking condenser 37 has one plate thereof connected to the grid 34 by conductor 38. The other plate of condenser 37 is connected by conductor 39 to the plate 31. The capacity of the condenser formed by sheets 30 and 31 is polarized by battery 40 and high resistance 41. The filament battery 42 heats the filament 43. The plate current is furnished by battery 44. The plate circuit contains the primary 45 of the transformer. A secondary winding 46 of the transformer delivers its output to an amplifier 47, the output of which is delivered to a winding 48 of an electromagnet. An armature 49 pivoted at 50' and biased by hair springs 51' carries a mirror 52' upon which a beam of light 53' is focused by lens 54. As the current in winding 48 varies, the armature 49 will vary, reflecting beam 53' along path 55 upon a photosensitive strip 56 which is passed from spool 57 to spool 58 at a constant speed. In this manner, a trace of the vibrations is recorded.

Figure 3:
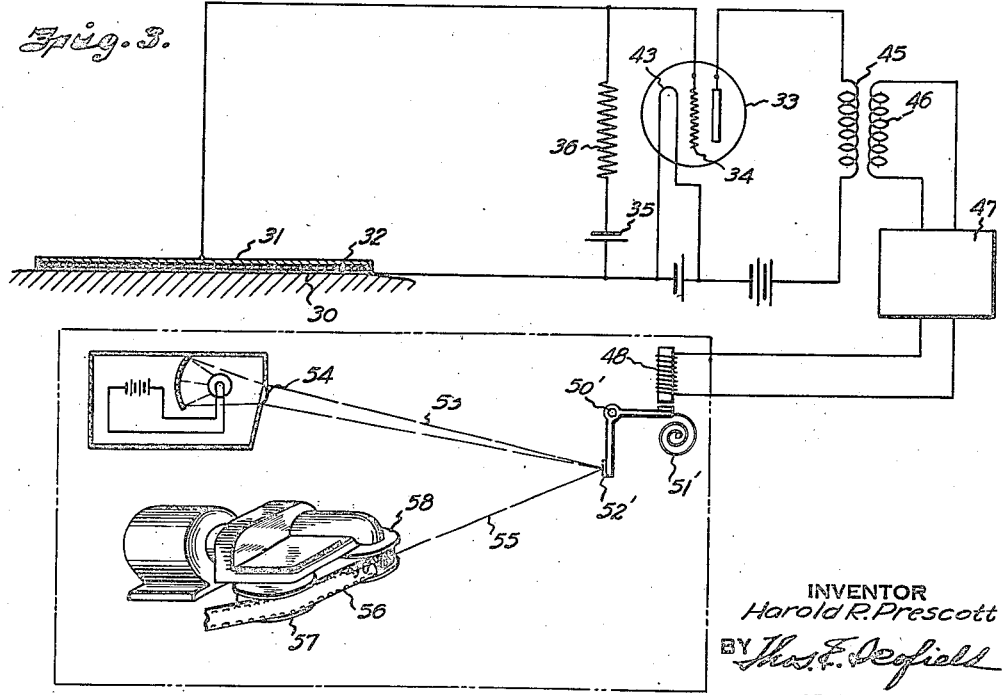
Figure 3 is a diagrammatic view of another form of apparatus capable of carrying out the objects of my invention.

Referring now to Figure 3, the plates 30 and 31 form a condenser as in the form of the device shown in Figure 2 having a high initial capacity since the area of the device may cover several thousand square feet. It will be observed that resistance 36 and battery 35 is across the condenser formed by sheets or plates 30 and 31. When the capacity of the receptor changes due to earth motion, the electrical charge upon plate 31 must adjust itself with respect to plate 30. This can be done only by a passage of current through the resistance and the battery. The grid 34 will respond to the change of potential resulting from the current change in the resistance.

It will be obvious that the differential motion between elements 30 and 31 may be utilized in a variety of ways. Sheet 32 may be made of material whose resistance will vary with pressure, as for example carbon. When a differential motion takes place, due to the reception of earth vibrations, variable pressure will be placed upon the thin layer of material 32, varying the electrical resistance. This variation of electrical resistance may be employed to place an electrical potential upon the input of an amplification channel. It will be further observed that the lower sheet 30 may be dispensed with and the dielectric material, in the case of capacity, or the resistance material, in the case of resistance, may be placed directly upon the earth which would serve as the lower sheet or filament.

Referring now to Figure 4, I have shown an alternate apparatus capable of carrying out the process of my invention. The earth has a magnetic field which, in latitudes of the United States, has an appreciable horizontal component. In Figure 4, 50 represents insulated wires forming a grid, which wires are laid upon the earth's surface extending approximately at right angles to the horizontal component of the earth's magnetic flux. The insulation around the wires is given considerable weight so that, when the earth moves due to vibration, the grid of wires will move with the earth. The ends of the respective wires are connected to conductors 51 and 52, forming a circuit in which the primary 45' of the transformer is interposed.

The magnetic flux of the earth tends to remain substantially fixed in magnitude and fixed in position as the earth's surface moves locally. It will be apparent that the motion of the wires will cut magnetic lines of force when the wires move due to the echo or reflection from the geological beds beneath, and a voltage will be induced in the grid and, consequently, the circuit through the primary of the transformer 45', in sympathy with the motion. A number of grids in parallel may be employed to cover a large area. In practice it is desirable in many cases that a single area receptor cover as much as one hundred thousand square feet. The sensitivity of the device may be increased either by increasing the size of the area receptor or increasing the number of wires in each grid or each section of the grid, while providing an input transformer with the proper impedance at the input winding. An area receptor of the character described in Figure 4 is a unit of very low impedance and the input transformer provides a good means of increasing the voltage delivered to the grid 34 of the triode 33. For example, the receptor may have an impedance as low as .01 of an ohm at the reflection frequencies. The impedance of the input winding of primary winding 45' of the transformer could be in the neighborhood of .01 of an ohm, but the impedance of the secondary winding 46' of the transformer should be very high. For reflection frequencies which are normally not less than 25 cycles per second nor greater than 80 cycles per second, it is practical to provide an impedance in the secondary winding 46' of the transformer of about a million ohms. The transformer then will provide a voltage step-up of approximately three thousand.

The conductors 51 and 52 are provided with a shielding 53 of soft iron to prevent these conductors from cutting lines of force.

In the form of the device shown in Figure 4, I have taken a receptor 5,000 cm. in length, which receptor had an impedance of .01 of an ohm. A reflection from a very deep tectonic formation will ordinarily be of approximately the amplitude of $1 \times 10^{-6}$ cm. In Oklahoma, the horizontal component of the earth's magnetic flux has an intensity of .25 gauss. The root mean square voltage induced in the area receptor in Oklahoma was, $$E_1 = 4.44 \cdot \text{frequency} \cdot \phi \text{ max} \cdot 10^{-8}$$
$$E_1 = 4.44 \cdot \text{frequency} \cdot (5000 \cdot 1 \cdot 10^{-6}) \cdot 10^{-8}.$$

50 cycles per second is a customary value of the reflection frequency and at this value, $$E_1 = 2.7 \cdot 19^{-9}.$$

Due to the transformer action at transformer T having windings 45 and 46, $$E_2 = 2.8 \cdot 10^{-9} \cdot 3000 = 8.4 \cdot 10^{-6}.$$

It will be observed that those skilled in the art will recognize this voltage as sufficiently large and above the noise level of an amplifier to develop sufficient energy to operate a recorder. In the amplifier which I used, this voltage produced an amplitude of 30 mm. on the photographic record. Amplitudes of 10 mm. are sufficiently large for practical analysis.

By referring to Figures 5 and 6, the advantages of my method of receiving impulses from an area rather than from a point can be readily ascertained. Points $a_1$, $b_1$, $c_1$, and $d_1$ are in phase, as are $a_2$, $b_2$, $c_2$, and $d_2$ and subsequent arrivals $a_3$, $b_3$, $c_3$, and $d_3$. It will also be observed that, as a result of the unconsolidated jellylike surface the undesirable, useless surface movements will give indications greater than the useful vibrations which are reflected from sub-surface strata. All of the points covered by the area receptor receive earth motions of two kinds, namely the local, undesirable, near surface vibrations and the useful reflections from deep beds. The reflections from the deep beds are in phase, while the useless, near surface particle vibrations are random vibrations which are out of phase and hence interfere with one another. Due to the large area covered by the area receptor, the additive effect of the useful motions in phase will result in emphasizing the useful arrivals, while the useless, out of phase vibrations will tend to cancel each other. The total of traces $a$, $b$, $c$, and $d$, and several thousand more, will give the result shown in Figure 6. In each trace, $x$ represents the total resulting in a trace given by the process of my invention.

By referring to Figure 5, it will be observed that the useful arrivals at $x_2$ and $x_3$ on trace $x$ cannot be distinguished upon traces $a$, $b$, $c$, and $d$ of Figure 5.

It will be further observed that useful vibrations from the geological layers travel to the surface from the layers in a substantially vertical direction, and will therefore arrive at the surface at substantially the same time. The useless, random surface particle vibrations, however, propagate in a direction chiefly horizontal. These horizontal motions will arrive at the different points in the area at different times.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a method of making geophysical explorations in which a seismic wave is generated at or near the earth's surface for reflection from a subsurface stratum, the step of receiving vibrations at or near the earth's surface over an extended and substantially continuous area, converting said vibrations into an electric current of varying voltage, controlling said current as a function of the integral of all vibrations received over said extended area at any instant, said substantially continuous area being such that the incidental vibrations in the near surface layers are substantially annulled by interference, while reflected vibrations from a subsurface stratum have a cumulative effect, and recording the resultant current fluctuations.

2. A method of making geological explorations including the steps of generating seismic waves at or near the earth's surface for reflection from a subsurface stratum, receiving reflections of said waves over an extended area on or near the earth's surface, integrating the waves received at any particular instant over said extended surface, converting the integral of said waves into a varying electric current as a function of said integral, recording said current variations, said extended surface being such that extended waves generated in the near surface layers will be substantially rejected by interference, while the effect of the reflected waves in phase will be cumulative, whereby the combined effect of the reflections from a subsurface stratum will be recorded.

HAROLD R. PRESCOTT.